United States Patent [19]
Hansen

[11] Patent Number: 5,814,123
[45] Date of Patent: Sep. 29, 1998

[54] METHOD FOR IMPROVING SURVIVAL OF PLANTS IN CONDITIONS OF REDUCED WATERING

[75] Inventor: Ronald P. Hansen, New South Wales, Australia

[73] Assignee: Ecologel USA, Inc., Ocala, Fla.

[21] Appl. No.: 970,546

[22] Filed: Nov. 2, 1992

Related U.S. Application Data

[63] Continuation of Ser. No. 739,455, Aug. 2, 1991, abandoned.

[51] Int. Cl.⁶ .................................................. C05F 11/00
[52] U.S. Cl. .................................. 71/11; 71/27; 71/64.1
[58] Field of Search ................................. 71/1, 11, 64.1, 71/27, 33, 64.08, 64.09, 90.4

[56] References Cited

U.S. PATENT DOCUMENTS

| | | |
|---|---|---|
| 3,647,458 | 3/1972 | Schattner . |
| 3,820,976 | 6/1974 | Wells et al. . |
| 4,047,925 | 9/1977 | Barer . |
| 4,252,831 | 2/1981 | Gleekler et al. ........................ 71/33 X |
| 4,624,694 | 11/1986 | DelliColli . |

FOREIGN PATENT DOCUMENTS 1235917  5/1988  Canada .

OTHER PUBLICATIONS

Derwent Abstract, Japanese Patent (JP) 02–49704 (1990).
Chemical Abstract, Soviet Union Patent 1,569,336.
Abstract, Japanese patent (JP) 60–84385.

*Primary Examiner*—Wayne A. Langel
*Attorney, Agent, or Firm*—Pendorf & Cutliff

[57] ABSTRACT

Improved solutions for watering plant roots and methods of application, the solutions containing in parts by volume (1) humectant from 25 to 75, (2) thickener from 0.2 to 1.5, (3) binder from 0.2 to 5, (4) wetting agent from 0.2 to 2.0 and (5) water 75 to 25.

18 Claims, 1 Drawing Sheet

METHOD FOR IMPROVING SURVIVAL OF PLANTS IN CONDITIONS OF REDUCED WATERING

This is a Continuation of application Ser. No. 07/739,455 filed Aug. 2, 1991, abandoned.

BACKGROUND OF THE INVENTION

1. Summary of the Invention

This invention relates to improved solutions for watering plant roots and methods of application, and more particularly, to water soluble solutions for application to grass and other root bearing plants, the solutions including a humectant as its principle constituent and also including a thickener, a binder and a wetting agent as additives so that during humid evenings the humectant will act to collect moisture and during hot days the humectant will act to release the collected moisture for feeding the plant roots thereadjacent.

2. Description of the Background Art

In conditions of water scarcity and/or high evaporation loss rates due to high temperatures, low humidity, high winds, etc., soil loses water rapidly. Moisture in the soil is drawn to exposed soil surfaces by capillary action thereby replacing the moisture lost by evaporation into the air. At the same time, moisture drawn from the soil into plant root fibers by osmosis is transpired through the plant stems and leaf systems, and that fraction not converted by photosynthesis is then lost by evaporation from pores of leaf surfaces. Soil can quickly become dehydrated to very low moisture content.

The survival of plants in such conditions thus depends on the amount of soil moisture which is accessible to the plant root systems. This is that fraction of the total soil moisture remaining after losses via the capillary/evaporative process. Since the evaporative losses mean soils are driest near the surface, plants with shallow root systems such as grasses and other small species, are affected more rapidly than deep-rooted plants such as trees, etc.

Where there is a marked change in ground temperatures between day and night, there is a significant air inhalation into porous soils during the night-time cooling (contraction) cycle and exhalation of air and moisture in the heat of the day. This further aggravates the overall evaporative moisture loss.

The invention described herein reduces the losses of moisture from direct evaporation, improves the proportion of soil moisture accessible to plants, and in certain conditions prevents or even reverses the evaporative loss from day/night movement in and out of porous soils.

Commercially available chemical compositions, the literature and patents disclose many compositions and methods for treating plant roots. Note, for example, U.S. Pat. Nos. 3,798,838 to Hashimoto; 4,063,919 to Grano; 4,380,886 to Koslow; 4,469,502 to Heller, and 4,540,427 to Helbling.

The patent to Hashimoto discloses fertilization and irrigation of highly permeable surface soils in semi-arid regions wherein the soils are contacted with an aqueous solution of a water soluble plant nutrient salt and an effective amount of a partially hydrolyzed polyacrylamide to reduce the permeability of the soil without rendering it impermeable to water flow. It has been found that water soluble plant nutrients and the aforementioned partially hydrolyzed polyacrylamide exhibit a synergistic effect to decrease the water permeability of the soils. It has also been found that plants grow better in the treated soil and are more efficient in uptake of nutrients from the soil. These discoveries can be used to conserve water and fertilizer and improve the efficiency of agronomy by contacting the soil with a solution having a concentration of from 0.001 to about 1 weight percent of a polyacrylamide having from 5 to about 80 percent of its amide groups hydrolyzed to carboxylic acid groups and from 0.001 to 5 weight percent of a water soluble, plant nutrient salt.

The patent to Grano relates to a fertilizer rod composition comprising about 100 parts of a polyvinyl alcohol, about 0 to 20 parts of a plasticizer and about 10 to 350 parts of a fertilizer, a process for producing such rod and a product of such process.

The Koslow patent describes a method of promoting the transport of water through medium and coarse grained soils comprising the step of applying to the medium or coarse grained soil a soil amendment composition at a level of less than 20 parts per million parts by weight of dry soil, and preferably less than 5 ppm. The composition comprises a substantially linear, substantially water-soluble hydrophilic polymer having a molecular weight greater than 50,000. A preferred polymer is poly (ethylene oxide) having a molecular weight of 300,000 to 7,000,000.

The Heller patent discloses a process for supplying plants with nutrients uniformly and over a long period of time by the addition of nutrient-charged synthetic resin ion exchangers and mineral fertilizers to the culture medium, according to which the nutrient-charged synthetic resin ion exchangers are employed together with those mineral fertilizers with particle size less than 500 $\mu$m which have been coated with massive polyurethanes having a particular water absorbing capacity which is adapted in a particular manner to the water solubility of the mineral fertilizer; furthermore, fertilizers containing nutrient-charged synthetic resin ion exchangers, and the mineral fertilizers coated with the massive polyurethanes having a particular water absorbing capacity.

The Helbling patent discloses a method for improving the water conservation properties of soil. The method increases the ability of the soil to absorb and retain water and acts to stabilize the loosening of break-up of the soil.

In addition, the Merck Index discloses the use of sorbitol and other substances as humectants.

No prior art composition or method of application provides the objects and advantages of the present invention.

It has now surprisingly been found that humectants in aqueous solutions with an appropriate thickener, binder and wetting agent function extremely well in improving the watering of plant roots.

It is therefore an object of this invention to provide improved solutions for watering plant roots and methods of application, the solutions containing in parts per volume (1) humectant from 25 to 75, (2) thickener from 0.2 to 1.5, (3) binder from 0.2 to 5, (4) wetting agent from 0.2 to 2.0 and (5) water 75 to 25.

It is a further object of the invention to water lawns and other plant root systems with the aid of a humectant.

It is a further object of the invention to utilize chemical solutions to entrap moisture, then release such entrapped moisture for watering the roots of plants.

It is a further object of the invention to foster ecological objectives by reducing the consumption of water for plant maintenance.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

For the purpose of summarizing this invention, this invention may be incorporated into improved solutions for watering plant roots and methods of application, the solutions containing in parts by volume (1) humectant from 25 to 75, (2) thickener from 0.2 to 1.5, (3) binder from 0.2 to 5, (4) wetting agent from 0.2 to 2.0 and (5) water 75 to 25.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other chemical compositions and methods for carrying out the same purposes of the present invention. It should also be realized by those skilled in the art that such equivalent compositions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
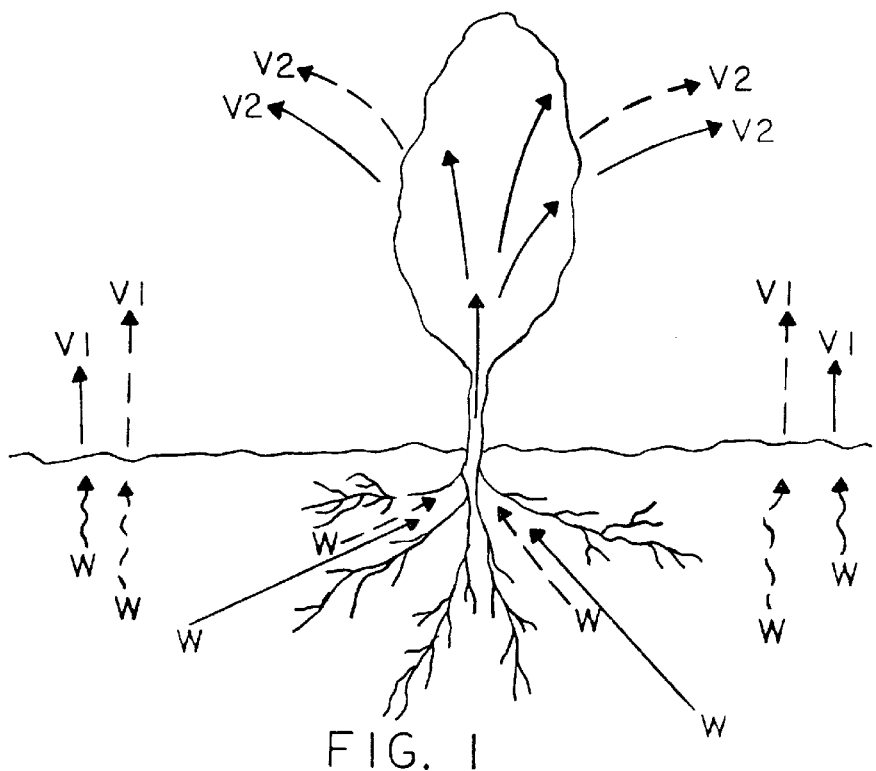
FIG. 1 is a sectional view of a plant in soil illustrating a normal and an improved cycle of moisture for watering such plant.
Figure 2:
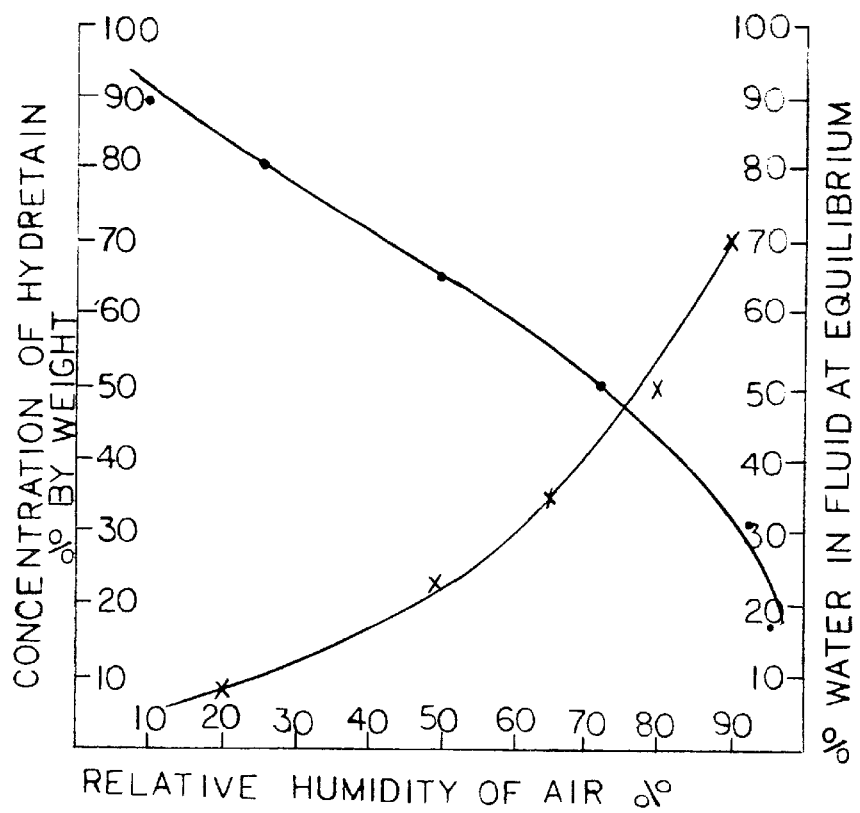
FIG. 2 is a graph illustrating the various characteristics of solutions prepared in accordance with the present invention.

Many substances are effective to function as a humectant. A humectant has the particular property of tending to maintain a constant humidity in air which is in contact with a saturated solution of such humectant. At a given temperature, such a solution will emit moisture into air where the relative humidity is below the characteristic equilibrium point for that substance. Such solution will also extract moisture from air at higher humidities. For the purposes of this application, humectant is defined as a substance which absorbs moisture easily at certain humidity levels and reduces the rate of moisture transmission out of the treated substance.

Each such humectant or mixture of substances containing a humectant has a characteristic humidity equilibrium point. For example, at 20 degrees C, a substance, calcium chloride, which is commonly used as a dust-suppressant on dirt surfaces, has an equilibrium point of about 33 percent relative humidity. The equilibrium point for zinc chloride solution is about 10 percent. For sodium chloride (common salt) the equilibrium point is around 75 percent.

In anything more than trace levels, most metallic salts, such as those discussed above, are inimical to plant life and thus cannot be considered as aids for reducing moisture loss from soils.

Certain organic substances, including some glycols and polyhydric alcohols such as glycerol and sorbitol, have similar humectant effects and humidity equilibrium points. As a result, solutions of them will inhibit evaporation to, and absorb moisture from, air at relative humidities above their equilibrium points.

From various experiments it has been surprisingly found that in blends of glycerol and/or sorbitol with the sodium or potassium salt of alpha-hydroxypropionic acid, there is a synergistic effect enhancing the humectant property of each alone. This is marginally enhanced further by the addition of small quantities of other substances including a thickener such as sodium carboxymethyl cellulose, a binder such as a water-soluble polysaccharide and a non-ionic surfactant or wetting agent such as a nonyl phenol (9–15 mole) ethoxylate, calcium lignosulfonate.

Humectant formulations as described herein are preferably prepared in the form of concentrated solutions which can then be diluted with water on site. Humectants which function herein for the intended purposes include sorbitol, molasses, potassium lactate, sodium lactate, glycerol, potassium acetate and sodium acetate. Sorbitol is a well known readily available chemical. See e.g. Merck Index, 8th Edition, pg. 971.

An additional component of the formulation is a thickener, preferably Aqualon. Aqualon is a trademark of Hercules, Inc. of Wilmington, Del. Aqualon is a cellulose ether adhesive thickener. Other thickeners include hydroxy ethyl cellulose, carboxy methyl propyl cellulose, etc.

An additional component of the formulation is the binder, preferably LIGNOSITE. LIGNOSITE is a trademark of Georgia Pacific Corporation of Houston, Tex. LIGNOSITE is a hygroscopic adhesive binder consisting of a wheaten or potato dextrin, or a calcium or sodium or ammonia salt of lignosulfonic acid.

An additional component of the formulation is the wetting agent TRITON 101. TRITON 101 is a trademark of the Rohm and Haas Corporation of Philadelphia, Pa. TRITON 101 is a preferred chemical wetting agent or surfactant, a non-ionic surfactant compatible with the humectant and other components of the solutions described herein. Other wetting agents include TRITON X100, NINOL II-CN, IGEPAL 60630, nonyl phenol ethoxylate 9–15 mole.

These components of the concentrated solution are utilized in parts per volume based on the total composition which includes (1) humectant from 25 to 75, (2) thickener from 0.2 to 1.5, (3) binder from 0.2 to 5, (4) wetting agent from 0.2 to 2.0 and (5) water 75 to 25.

A more specific preferred range includes (1) humectant 30 to 60, (2) thickener 0.2 to 0.5, (3) binder 0.2 to 5.0 (4) wetting agent 0.2 to 2.0, and (5) water 60 to 30.

The preferred example was mixed as follows:

EXAMPLE I

| Material | Parts by Volume |
| --- | --- |
| (1) Humectant, SORBO Solution | 44.35 |
| (2) Thickener, AQUALON CMC-7LT | 0.36 |
| (3) Binder, LIGNOSITE CX | 1.34 |
| (4) Wetting Agent, TRITON N-101 | 0.60 |
| (5) Water | 53.38 |

Item 1 functions as a humectant. Items 2 and 3 are the thickener and the binder which have a secondary function in addition to enhancing the overall humectant action of the compound. The thickening and adhesive nature of these assists the anchoring of microthin coatings of the diluted compound to soil particles and plant root systems, reducing losses by migratory leaching during evaporation-induced capillary action. Item 5, the wetting agent, plays little or no part in the moisture-control function of the system. It aids wetting and penetration of soils which contain hydrophobic ingredients. For certain application, the wetting agent may be totally eliminated. The water makes the composition a liquid in concentrated form for being mixed with additional water on site for application.

These concentrates can then be formulated readily into aqueous solutions. The concentrate can be diluted with from about between 2 to 20 parts of water. The higher concentrations such as 2 to 1 are for plants with larger root structures such as trees. The lower concentrations such as 20 to 1 are for plants with smaller root structures such as grasses. The formulations ranges of the concentrated solutions are proportioned to the amount of water to dilute it.

The compound is best applied to soil surfaces, not directly to plant leaf systems. It may also be inserted into water reticulation/irrigation systems, by proportioning devices so as to be diluted to similar concentrations in sprinkler sprays or trickle feed systems. If in sprinklers, it is effective to stop the feed of compound prior to terminating a particular watering, in sufficient time for accumulated compound on plant leaves to be washed off into the soil where it is required.

Watering is preferably at rates between about 4 and 100 ml of the diluted solution per square meter. The higher rates are for plants with larger root structures such as trees. The lower rates are for grasses and other plants with smaller root structures such as grasses.

In soils treated with the improved solutions of the present invention, the amount of the compound is only a very small fraction of the mass of soil being tapped by the root systems of the plants. It has been found that the principal benefit to the plant is provided by the minute quantity of compound remaining in close contact with the hair fibers at the extremities of roots.

For example, in tests, thirty tomato seedlings 8 cm high were removed from their germination soil and had their roots washed clean before being re-planted in original soil with a measured moisture content of 18 percent by weight. Twenty were washed in water only and ten in a 10 percent dilution of the above formulation. Of the twenty water-washed seedlings, half were immediately re-planted in soil surface-watered with a similar 10 percent dilution of the invention. All other seedlings were watered with a similar quantity of water only. All were then left with no further watering for ten days.

Of the 10 with roots washed in the invention fluid, 8 survived. Of the 10 washed in water only, in plain soil, only 2 survived. Of the 10 likewise water-washed, but with the invention fluid added to the soil via initial surface-watering, 6 survived.

Similar experiments with other plant varieties gave generally similar results, with survival rates of plants being generally enhanced by 50 to 100 percent compared with similar plants in untreated soils.

It is evident that the fluid accumulated on root hairs is one of the factors in enhanced plant survival. Experiments with selectively-soluble tracer dyes indicate little if any of the compound is actually absorbed into the plant structure but remains around the root hairs or in the soil adjacent thereto.

The main function of the compound relates to its aforesaid property of maintaining constant humidity of air in contact with it. Thus, a micro-thin film of the compound around soil particles and root fibers, will have its dissolved moisture extracted by the powerful osmosis action of root fibers, effectively increasing the concentration of the compound vis a vis its remaining water. During the stated inhalation of air into the soil during a cooling phase, moisture will tend to be absorbed from the air by the compound, replacing that extracted by the plant system.

FIG. 1 shows in sectional view a plant in soil illustrating in dotted lines a normal cycle of moisture for watering such plant. In solid lines is an improved cycle of moisture for watering such plant.

FIG. 2 illustrates this effect at various humidities and concentrations of the humectant fluid with the negative curve, and also shows with the positive curve the hygroscopicity of the compound at different relative humidities.

For practical applications, the humectant may be a combination of humectants.

EXAMPLE II

| | Material | Parts per Volume |
|---|---|---|
| 1A. | Potassium lactate | 25 |
| 1B. | Sorbitol | 10 |
| 2. | Sodium carboxymethyl cellulose | 1.0 |
| 3. | Calcium lignosulfonate | 1.5 |
| 4. | Soya-amine ethoxylate | 0.007 |
| 5. | Water | 53 |

Low percentages of humectant are used in extremely high humidity areas.

The following are further examples:

EXAMPLE III

| | Material | Parts by Volume |
|---|---|---|
| (1) | Molasses | 50.0 |
| (1a) | Other Humectant, Potassium Lactate | 20.0 |
| (2) | Thickener, Hydroxy Ethyl Cellulose | 0.2 |
| (3) | Binder, LIGNOSITE | 30.0 |
| (4) | Wetting Agent, TRITON 101 | 0.0 |
| (5) | Water | 9.8 |

Solutions without wetting agents include sandy, porous soils which are easily penetrated.

It is to be understood that this invention is not limited to the specific examples which have been offered as particular embodiments and that modifications can be made without departing from the spirit thereof.

Now that the invention has been described,

What is claimed is:

1. A liquid concentrate solution composition for improving plant root watering consisting essentially of an organic humectant, a thickener, a binder and water, in which the parts by volume based on the total composition are (1)

humectant from 25 to 75, (2) thickener from 0.2 to 1.5, (3) binder from 0.2 to 5, and (4) water 75 to 25.

2. A liquid concentrate solution composition for improving plant root watering consisting essentially of an organic humectant, a thickener, a binder, a wetting agent, and water, in which the parts by volume based on the total composition are (1) humectant from 25 to 75, (2) thickener from 0.2 to 1.5, (3) binder from 0.2 to 5, (4) wetting agent from 0.2 to 2.0 and (5) water from 75 to 25.

3. The composition of claim 1 in which the parts by volume based on the total composition are:

| | Material | Parts by Volume |
|---|---|---|
| (1) | Humectant, SORBO Solution | 44.35 |
| (2) | Thickener, AQUALON CMC-7LT | 0.36 |
| (3) | Binder, LIGNOSITE CX | 1.34 |
| (4) | Wetting Agent, TRITON N-101 | 0.60 |
| (5) | Water | 53.38. |

4. The composition of claim 1 in which the parts by volume based on the total composition are:

| | Material | Parts per Volume |
|---|---|---|
| 1A. | Potassium lactate | 25 |
| 1B. | Sorbitol | 10 |
| 2. | Sodium carboxymethyl cellulose | 1.0 |
| 3. | Calcium lignosulfonate | 1.5 |
| 4. | Soya-amine ethoxylate | 0.007 |
| 5. | Water | 53. |

5. The composition of claim 1 in which the parts by volume based on the total composition are:

| | Material | Parts by Volume |
|---|---|---|
| (1) | Molasses | 50.0 |
| (1a) | Other Humectant, Potassium Lactate | 20.0 |
| (2) | Thickener, Hydroxy Ethyl Cellulose | 0.2 |
| (3) | Binder, LIGNOSITE | 30.0 |
| (4) | Wetting Agent, TRITON 101 | 0.0 |
| (5) | Water | 9.8. |

6. The composition of claim 1 which has been diluted with between about 2 to 20 parts of water.

7. The composition of claim 1 wherein the humectant is selected from the group consisting of sorbitol, molasses, potassium lactate, sodium lactate, glycerol, potassium acetate and sodium acetate.

8. The composition of claim 1 in which the parts by volume based on the total composition are (1) humectant 30 to 60, (2) thickener 0.2 to 0.5, (3) binder 0.2 to 5.0, (4) wetting agent 0.2 to 2.0, and (5) water 60 to 30.

9. The method for improving watering of plant roots which comprises introducing a composition of claim 6 to the main root areas of the plant root.

10. A method of improving watering of plant roots as in claim 9, wherein said composition is provided to said root areas in an amount sufficient to reduce the loss of moisture from direct evaporation and improve the proportion of soil moisture accessible to plants.

11. A liquid concentrate solution composition for improving plant root watering consisting essentially of from 25 to 75 parts by volume of an organic humectant selected from the group consisting of glycols and polyhydric alcohols, from 0.2 to 1.5 parts by volume of a thickener, from 0.2 to 5 parts by volume of a binder, from 0.2 to 2.0 parts by volume of a wetting agent, and from 75 to 25 parts by volume of water based on the total composition.

12. A liquid concentrate solution composition as in claim 11, wherein said organic humectant is selected from the group consisting of glycerol, sorbitol, molasses, potassium lactate, sodium lactate, potassium acetate and sodium acetate.

13. A liquid concentrate solution composition as in claim 11, wherein said organic humectant comprises a blend of glycerol and/or sorbitol with the sodium or potassium salt of alphahydroxypropionic acid.

14. A liquid concentrate solution composition as in claim 11, wherein said thickener is a sodium carboxymethyl cellulose or a cellulose ether adhesive thickener.

15. A liquid concentrate solution composition as in claim 11, wherein said binder is selected from the group consisting of (1) a water soluble polysaccharide, (2) a hygroscopic adhesive binder consisting of a wheaten or potato dextrin, and (3) a calcium, sodium or ammonia salt of lignosulfonic acid.

16. A liquid concentrate solution composition as in claim 11, wherein said wetting agent is a nonyl phenol (9–15 mole) ethoxylate or calcium lingnosulfonate.

17. A liquid concentrate solution composition for improving plant root watering consisting essentially of
   (a) from 25 to 75 parts by volume of an organic humectant selected from the group consisting of glycerol, sorbitol, molasses, potassium lactate, sodium lactate, potassium acetate and sodium acetate,
   (b) from 0.2 to 1.5 parts by volume of a sodium carboxymethyl cellulose or a cellulose ether adhesive thickener,
   (c) from 0.2 to 5 parts by volume of a binder selected from the group consisting of (1) a water soluble polysaccharide, (2) a hygroscopic adhesive binder consisting of a wheaten or potato dextrin, and (3) a calcium, sodium or ammonia salt of lignosulfonic acid,
   (d) from 0.2 to 2.0 parts by volume of a wetting agent, and
   (e) from 75 to 25 parts by volume of water based on the total composition.

18. A liquid concentrate solution composition for improving plant root watering consisting essentially of
   from 25 to 75 parts by volume of an organic humectant selected from the group consisting of glycerol, sorbitol, molasses, potassium lactate, sodium lactate, potassium acetate, sodium acetate, and blends of glycerol and/or sorbitol with the sodium or potassium salt of alpha-hydroxypropionic acid,
   from 0.2 to 1.5 parts by volume of a thickener selected from the group consisting of sodium carboxymethyl cellulose and a cellulose ether adhesive thickener,
   from 0.2 to 5 parts by volume of a binder selected from the group consisting of (1) a water soluble polysaccharide, (2) a hygroscopic adhesive binder consisting of a wheaten or potato dextrin, and (3) a calcium, sodium or ammonia salt of lignosulfonic acid,
   from 0.2 to 2.0 parts by volume of a wetting agent selected from the group consisting of a nonyl phenol (9–15 mole) ethoxylate and calcium lingnosulfonate, and
   from 75 to 25 parts by volume of water.

* * * * *